(12) United States Patent
Klimov et al.

(10) Patent No.: US 9,584,379 B2
(45) Date of Patent: Feb. 28, 2017

(54) SORTED EVENT MONITORING BY CONTEXT PARTITION

(71) Applicant: Microsoft Technology Licensing LLC, Redmond, WA (US)

(72) Inventors: Aleksandr Klimov, Vancouver (CA); Vitaly Filimonov, Bothell, WA (US); Alexandre Zakonov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 622 days.

(21) Appl. No.: 13/923,095

(22) Filed: Jun. 20, 2013

(65) Prior Publication Data

US 2014/0379892 A1    Dec. 25, 2014

(51) Int. Cl.
*H04L 12/26* (2006.01)
*G06F 11/30* (2006.01)

(52) U.S. Cl.
CPC .......... *H04L 43/04* (2013.01); *G06F 11/3072* (2013.01); *G06F 11/3006* (2013.01); *G06F 2201/86* (2013.01); *G06F 2201/865* (2013.01)

(58) Field of Classification Search
CPC .. H04L 43/04; G06F 11/3072; G06F 11/3006; G06F 2201/86; G06F 2201/865
(Continued)

(56) References Cited

U.S. PATENT DOCUMENTS 5,355,484 A * 10/1994 Record ................... G06F 9/542
714/E11.179

6,941,557 B1 * 9/2005 Jakobson ............... G06F 9/542
709/223
(Continued)

FOREIGN PATENT DOCUMENTS

| EP | 0537098 A2 | 4/1993 | |
|---|---|---|---|
| KR | WO 2012020973 A2 * | 2/2012 | ............. G06Q 10/04 |
| WO | WO 2013055257 A1 * | 4/2013 | ............. G06Q 10/04 |

OTHER PUBLICATIONS

"International Preliminary Report on Patentability Received for PCT Application No. PCT/US2014/042996", Mailed Date: Jul. 22, 2015, 10 Pages.
(Continued)

*Primary Examiner* — Kostas Katsikis
(74) *Attorney, Agent, or Firm* — Henry Gabryjelski; Kate Drakos; Micky Minhas (57) ABSTRACT

An event monitoring system that includes two stages, an event sorting stage and an event processing stage. The event sorting stage receives events provided by at least one application, and includes multiple event sorting systems. The event processing stage includes at least one event processing system that processes events forwarded by the event sorting stage. The event processing system(s) is/are capable of processing events that fall within a particular set of one or more context partitions that correspond to the respective event processing system. As the event sorting system receives an event, the event sorting system identifies which context partition the event falls within. The event sorting system then identifies the event processing system that corresponds to the identified context partition of the event, and then forwards the event to the identified event processing system. The event processing system then applies the set of one or more monitoring rules.

20 Claims, 5 Drawing Sheets

(58) Field of Classification Search
USPC .......................................................... 709/224
See application file for complete search history.

(56) References Cited

U.S. PATENT DOCUMENTS

| | | | |
|---|---|---|---|
| 8,286,168 B2 | 10/2012 | Wong et al. | |
| 8,504,750 B1* | 8/2013 | Sonksen | G06F 13/36 710/243 |
| 9,298,773 B2* | 3/2016 | Gupta | G06F 17/30864 |
| 2002/0129003 A1 | 9/2002 | Bakalash et al. | |
| 2003/0051184 A1* | 3/2003 | Black | G06F 21/554 713/400 |
| 2004/0268314 A1* | 12/2004 | Kollman | G06F 11/3476 717/128 |
| 2005/0010545 A1* | 1/2005 | Joseph | G06F 9/542 |
| 2005/0198111 A1* | 9/2005 | Lamb | G06Q 20/02 709/203 |
| 2006/0031018 A1* | 2/2006 | Bush | G06Q 50/24 702/19 |
| 2006/0136471 A1 | 6/2006 | Ge et al. | |
| 2006/0242295 A1* | 10/2006 | Husemann | G06F 19/3481 709/224 |
| 2006/0294347 A1* | 12/2006 | Zou | G06F 9/3009 712/244 |
| 2008/0126441 A1* | 5/2008 | Giampaolo | G06F 11/1461 |
| 2008/0208657 A1* | 8/2008 | Chessell | G06F 11/34 705/7.38 |
| 2008/0279113 A1* | 11/2008 | Kalliola | H04L 12/14 370/252 |
| 2009/0099820 A1* | 4/2009 | Kaplan | H04W 24/08 702/189 |
| 2009/0138858 A1* | 5/2009 | Livshits | G06F 11/3419 717/130 |
| 2009/0222539 A1 | 9/2009 | Lewis et al. | |
| 2009/0276445 A1 | 11/2009 | Flake et al. | |
| 2010/0088325 A1 | 4/2010 | Goldstein et al. | |
| 2010/0251002 A1* | 9/2010 | Sivasubramanian | G06F 9/5061 714/2 |
| 2011/0078704 A1* | 3/2011 | Mishali | G06F 8/316 719/318 |
| 2011/0099146 A1* | 4/2011 | McAlister | G06F 11/3006 707/634 |
| 2011/0314148 A1* | 12/2011 | Petersen | G06F 11/3476 709/224 |
| 2012/0005542 A1* | 1/2012 | Petersen | G06F 11/0709 714/48 |
| 2012/0096385 A1* | 4/2012 | Bank | G06Q 10/109 715/772 |
| 2012/0246303 A1* | 9/2012 | Petersen | G06F 17/30185 709/224 |
| 2012/0254337 A1 | 10/2012 | Fake et al. | |
| 2012/0266019 A1* | 10/2012 | Sim-Tang | G06F 11/1471 714/21 |
| 2014/0143304 A1* | 5/2014 | Hegarty | G06F 11/3438 709/203 |
| 2014/0201355 A1* | 7/2014 | Bishnoi | H04L 41/069 709/224 |
| 2014/0350888 A1* | 11/2014 | Gesmann | G06F 11/30 702/183 |
| 2014/0365834 A1* | 12/2014 | Stone | G06F 11/3476 714/57 |

OTHER PUBLICATIONS

"Overview of Oracle CEP", Retrieved on: Apr. 26, 2013, Available at: http://docs.oracle.com/cd/E16764_01/doc.1111/e14476/overview.htm.

Pierry, Rob,"Master Large Data Streams with Microsoft StreamInsight", Published on: Jun. 11, 2011, Available at: http://msdn.microsoft.com/en-us/magazine/hh205648.aspx.

"Financial Services Data Management Big Data Technology in Financial Services", Published on: Jun. 2012, Available at: http://www.oracle.com/us/industries/financial-services/bigdata-in-fs-final-wp-1664665.pdf.

"International Search Report & Written Opinion for PCT Patent Application No. PCT/US2014/042996", Mailed Date: Sep. 10, 2014, 13 Pages.

Isoyama, et al., "SCTXPF: Scalable Context Delivery Platform", In IEEE International Conference on Communications Workshops, Jun. 5, 2011, 5 Pages.

European Examination Report Issued in European Application No. 14736263.6 dated Oct. 12, 2016.

"Office Action Issued in European Patent Application No. 14736263.6", Mailed Date: Oct. 4, 2016, 9 Pages.

* cited by examiner

SORTED EVENT MONITORING BY CONTEXT PARTITION

BACKGROUND

Operations monitoring systems often applies monitoring rules against streams of events generated in the course of operations. The stream of events is used to evaluate or characterize operations, such as whether operations are proceeding normally, or whether one or more problems are occurring. One of the key metrics to measure efficiency of such monitoring systems is the shortness of the Mean Time to Mitigate (MTTM). MTTM refers to the mean time measured from the moment a problem appeared the first time to the time the problem is mitigated. MTTM relies on a metric called Time to Detect (TTD), which is the time from when the problem first appeared until the time that the problem was detected. After all, a course of action for mitigating a problem cannot be initiated until the problem itself is identified.

Accordingly, low latency problem detection solutions have been developed in such monitoring systems. One way to provide low latency is by offloading local event processing on agent machines, while leaving cross component, aggregation and other higher level processing to central management servers. This solution works fine with applications deployed on a single machine, when a local agent can cover the monitoring needs for a given application.

BRIEF SUMMARY

At least some embodiments described herein relate to an event monitoring system that includes two stages, an event sorting stage and an event processing stage. The event sorting stage receives events provided by at least one application, and includes multiple event sorting systems. The event processing stage includes at least one event processing system that processes events forwarded by the event sorting stage. The event processing system(s) is/are capable of processing events that fall within a particular set of one or more context partitions that correspond to the respective event processing system.

As the event sorting system receives an event, the event sorting system identified which context partition the event falls within. A context partition refers to a set of one or more characteristics in which all events possessing that set of characteristics will be monitored under the same set of one or more monitoring rules. The event sorting system then identifies the event processing system that corresponds to the identified context partition of the event. The event is then forwarded to the identified event processing system. The event processing system then applies the set of one or more monitoring rules.

As all of the events corresponding to a particular context partition are processed on a single event processing system, event processing may occur efficiently, allowing streams of events to also be efficiently processed, even if the stream of events are generated by a distributed application, and provide different streams to different event sorting systems.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to an event monitoring system that includes two stages, an event sorting stage and an event processing stage. The event sorting stage receives events provided by at least one application, and includes multiple event sorting systems. The event processing stage includes at least one event processing system that processes events forwarded by the event sorting stage. The event processing system(s) is/are capable of processing events that fall within a particular set of one or more context partitions that correspond to the respective event processing system.

As the event sorting system receives an event, the event sorting system identifies which context partition the event falls within. A context partition refers to a set of one or more characteristics in which all events possessing that set of characteristics will be monitored under the same set of one or more monitoring rules. The event sorting system then identifies the event processing system that corresponds to the identified context partition of the event. The event is then forwarded to the identified event processing system. The event processing system then applies the set of one or more monitoring rules.

As all of the events corresponding to a particular context partition are processed on a single event processing system, event processing may occur efficiently, allowing streams of events to also be efficiently processed, even if the stream of events are generated by a distributed application, and provide different streams to different event sorting systems.

Some introductory discussion of a computing system will be described with respect to FIG. 1. Then, embodiments of an event monitoring system and its operation will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
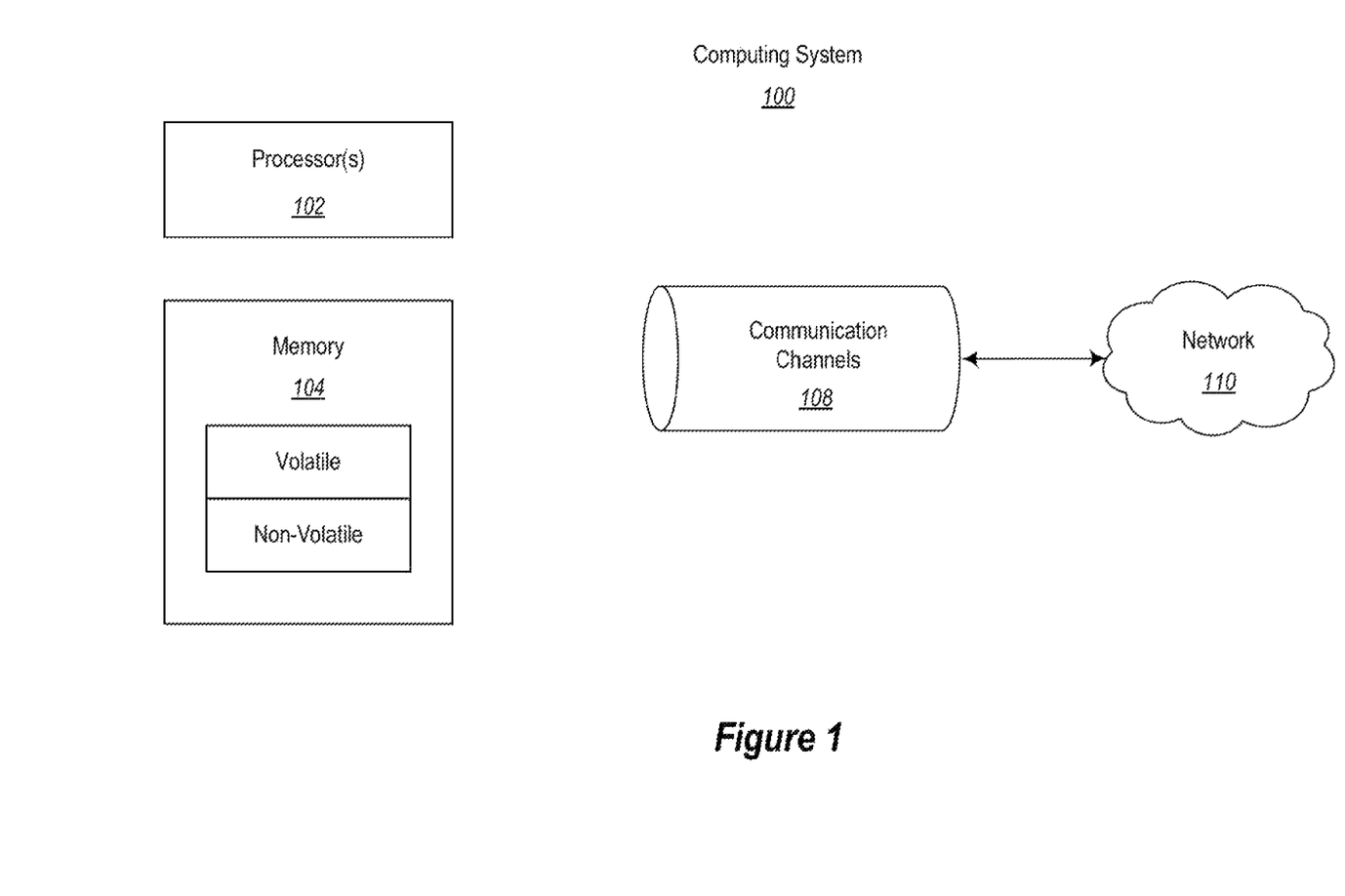
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
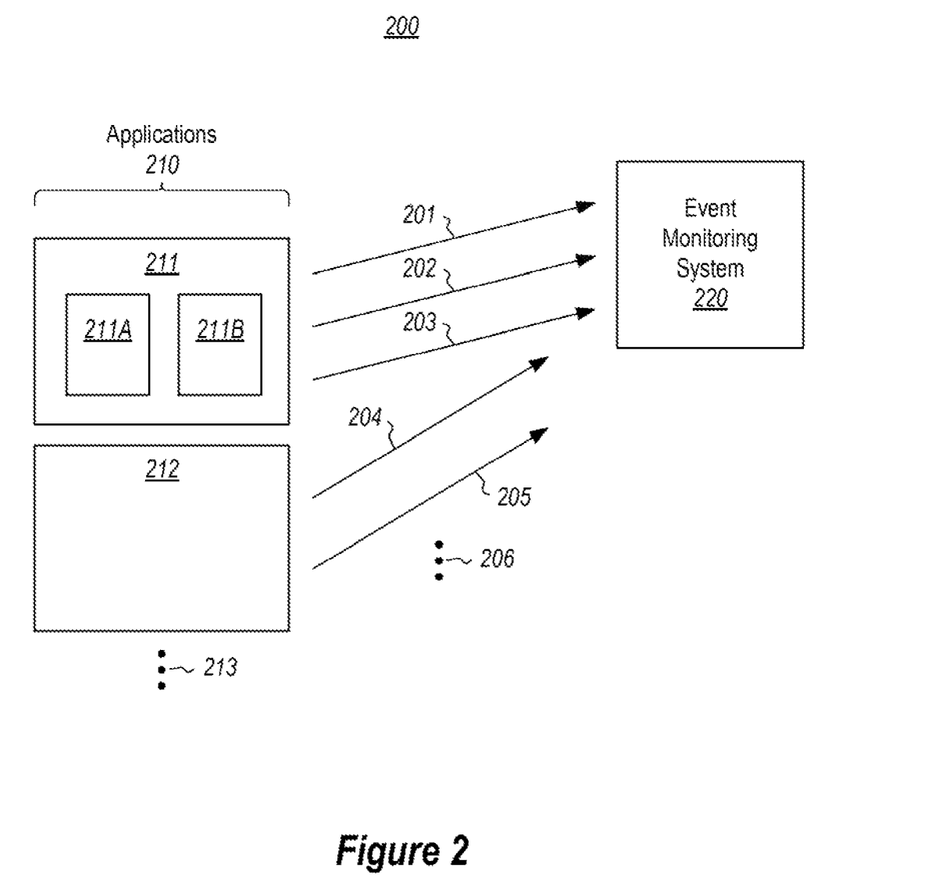
FIG. 2 schematically illustrates an event monitoring environment in which application provide events to an event monitoring system.

FIG. 2 illustrates an event monitoring environment 200. The event monitoring environment 200 includes applications 210 and an event monitoring system 220. The applications 210 may include one or more applications, but in FIG. 2, is illustrated as including applications 211 and 212. The ellipses 213 symbolically represent that the applications 210 may have more than these illustrated applications 211 and 212, and perhaps might include just a single application as well.

The event monitoring system 220 receives events from the applications 210. For instance, the event monitoring system 220 receives events 201 through 205 from the applications 210, although the ellipses 206 represents that the principles described herein may be used to monitor a large number of events from the applications 210.

One or more of the applications 210 may each be located on a single computing system, such as the computing system 100 of FIG. 1. One or more of the applications 210 might alternatively be distributed applications, with components running on different computing systems that are perhaps remotely located, and perhaps may be located in different parts of the globe. In fact, a particular advantage of at least some embodiments described herein is that the event monitoring system 220 may efficiently and quickly process events from multiple applications, even where one or more or even all of those applications are distributed. As an example, the application 211 is illustrated as including two components 211A and 211B (although the distributed application may have many more components). The two components 211A and 211B may be operated on different computing systems.

Figure 3:
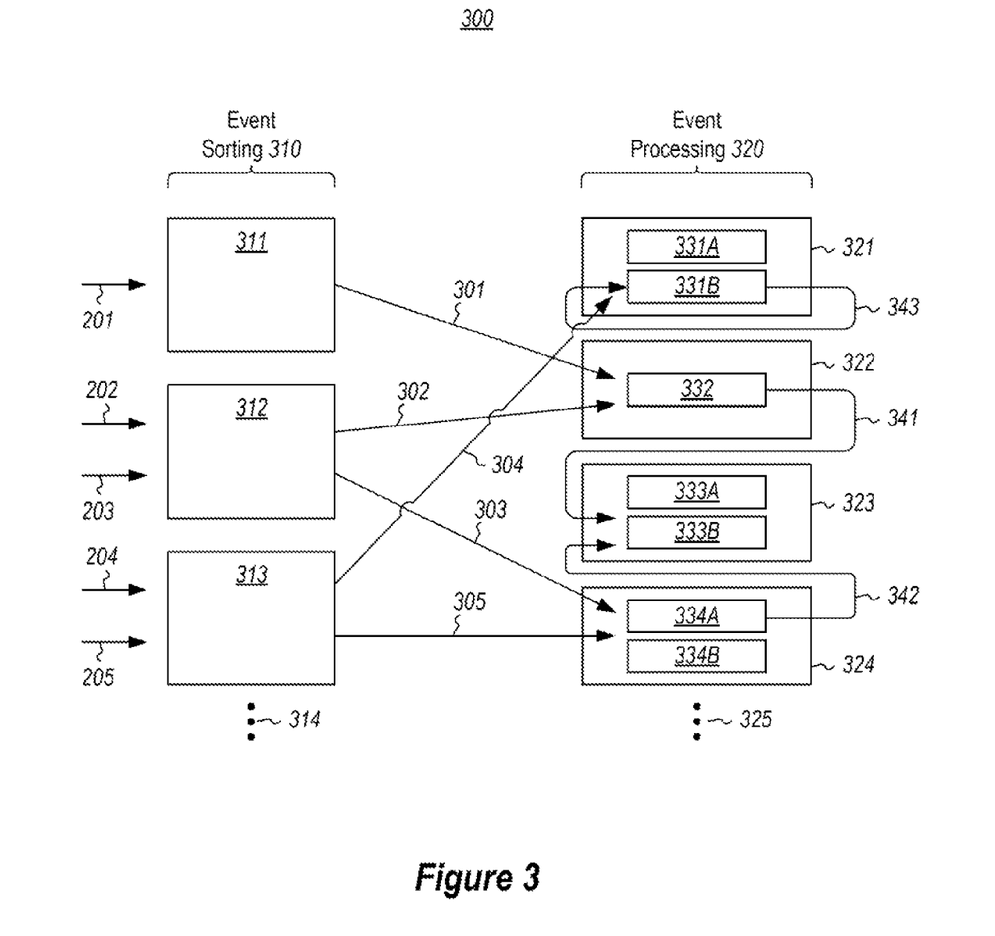
FIG. 3 schematically illustrates an event monitoring system that represents an example of the event monitoring system of FIG. 2, and includes an event sorting stage having multiple event sorting systems and an event processing stage having multiple event processing stages.

FIG. 3 illustrates an event monitoring system 300 that represents an example of the event monitoring system 220 of FIG. 2. For purposes of example only, the event monitoring system 300 is illustrated as receiving events 201 through 205 of FIG. 2. For purposes of this example, assume that event 201 is generated by the component 211A of the application 210, and that events 202 and 203 are generated by the other component 211B of the application 211. Assume further that the events 204 and 205 are generated by the application 212.

The event monitoring system 300 includes two stages including an event sorting stage 310 and an event processing stage 320. The event sorting stage 310 includes multiple event sorting systems 311 through 313, although the ellipses 314 represent that the event sorting stage 310 may include any number of event sorting systems. The event processing stage 320 includes multiple event processing systems 321 through 324, although the ellipses 325 represent that the event processing stage 320 may include any number of event processing systems. Each event sorting system 311 through 314, and each event processing system 321 through 325 may be structured as described above for the computing system 100 of FIG. 1. The event sorting stage 310 and the event processing stage 320 may each be distributed.

The event sorting stage 310 receives events (such as events 201 through 205) from various applications (such as applications 210 of FIG. 2). For instance, each of the event sorting systems 311 through 313 receives a subset of the total flow of events that are received by the event sorting stage 310. For events that are received by a given event sorting system 311 through 313, the event sorting system 311 through 313 determines a context partition associated with each event, and then forwards the event to whichever of multiple event processing systems is dedicated to processing events of that context partition.

A "context partition" is defined as a set of one or more characteristics of an event in which at least some of the events that share that common set of one or more characteristics are to be monitored collectively in a correlated way, so as to give rise to monitoring state. Because of this, events may be more efficiently monitored if the events of a common context partition are monitored on the same machine. Examples of the set of one or more characteristics include any one or more of the following: a customer identifier, an application identifier, a hosted service name, a role identifier, a namespace, a network site identifier, a time identifier and so forth. That said, the identity of what parameters may be used to define a partition is quite flexible. For instance, as described further below, a partition segment identifier may be used to implement loopback to allow even large partitions to be efficiently processed in multiple stages.

As an example only, the event processing system 321 is illustrated as dedicated to processing two context partitions 331A and 331B, the event processing system 322 is illustrated as dedicated to processing a single context partition 332, the event processing system 323 is illustrated as dedicated to processing two context partitions 333A and 333B, and the event processing system 324 is illustrated as dedicated to processing two context partitions 334A and 334B.

This means that no matter which event sorting system 311 through 313 actually receives an event having a particular context partition, that event will be forwarded to the correct event processing system 321 through 324 that monitors events of a particular context partition. Thus, events of a common context partition are monitored on the same event processing system, thereby being monitored more efficiently, even for events generated by distributed applications.

The monitoring rules to be applied when monitoring a particular partition are on the corresponding event processing system for that partition. Such localization of the monitoring rules to the same event processing system as the partition to which the monitoring rules are to be applied allows for faster application of the monitoring rules.

Such monitoring rules may include standard monitoring rules and custom monitoring rules. For instance, standard monitoring rules may be encompassed in a different object class than the custom monitoring rules. The standard monitoring rules object might include more general input parameters such as perhaps a type of monitoring to be performed (e.g., safety). The custom monitoring rules, on the other had may be populated with more detailed configuration that defines custom monitoring.

The monitoring rules may also be applied to streaming events, causing state to be maintained at the event processing system associated with the partition whose streaming events are to be monitored. Such state may be maintained in a "processor-addressable data vessel" of the corresponding event processing system. In this description, a "processor-addressable data vessel" is defined as non-volatile and/or volatile locations where data may be placed, and which may be addressable using a processor. An example of a processor-addressable data vessel is computer memory, which can be directly addressed by a processor, and which conventionally is volatile, but in modern systems, can also be partially or even fully non-volatile across its range of valid address locations.

This example is kept relatively simply in terms of the number of context partitions being processed by each of the event processing systems. However, the number of context partitions managed by a single event processing system may vary from as few as a single context partition to enumerable context partitions. Factors that may limit the number of context partitions processed by a single event processing system include the rate of incoming events anticipated for a particular context partition, and the amount of the processor-addressable data vessel usable by code that keeps track of state used to performing monitoring rules on the context partition.

Higher event rates will place a higher demand on the processing resources of the event processing system. Furthermore, larger requirements for tracking state will place a higher demand on the memory resources of the event processing system. It is advantageous to keep all state in memory so that processing may occur more quickly, and thus the time required to apply the monitoring rules on incoming event streams for a given context partition are reduced. This is enabled by consolidating all events of a common context partition on the same computing system and the same processor-addressable data vessel.

Figure 4:
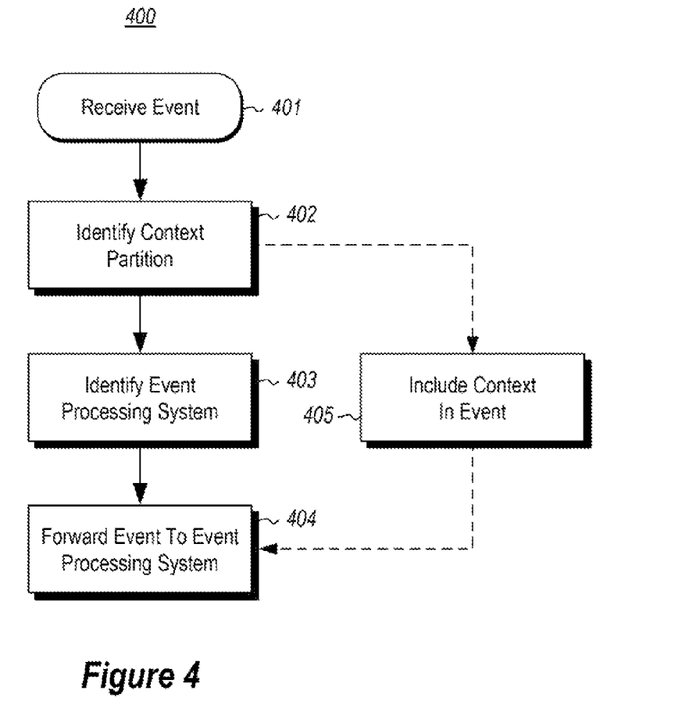
FIG. 4 illustrates a flowchart of a method for an event sorting system, such as those shown in FIG. 3, to sort incoming events.
Figure 5:
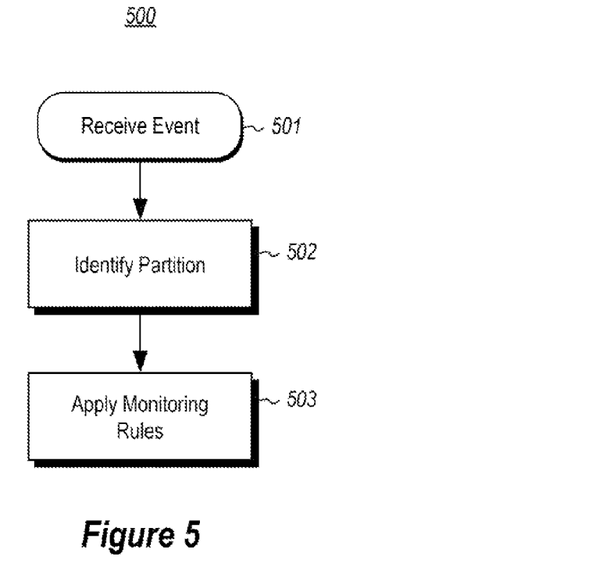
FIG. 5 illustrates a flowchart of a method for an event processing system, such as those shown in FIG. 3, to process incoming events.

FIG. 4 illustrates a flowchart of a method 400 for an event sorting system (such as any of the event sorting systems 311 through 313) to sort incoming events. FIG. 5 illustrates a flowchart of a method 500 for an event processing system (such as any of the event processing systems 321 through 324) to process incoming events. After describing FIGS. 4 and 5 in further detail, example processing of the events 201 through 205 in the context of the event monitoring system 300 will be described with respect to FIGS. 4 and 5.

Again, FIG. 4 illustrates a flowchart of a method 400 for an event sorting system to sort incoming events. The method 400 is initiated upon a particular event sorting system receiving an event (act 401). For instance, referring to the example of FIG. 3, the event sorting system 311 receives the event 201, the event sorting system 312 receives the event 202 and the event 203, and the event sorting system 313 receives the event 204 and the event 205.

The event sorting system that received the event then identifies which context partition the event falls within (act 402), identifies the event processing system (act 403) that corresponds to the identified context partition of the event, and forwards the event towards the identified event processing system (act 404). Optionally, the event sorting system also modifies the event (act 405) so that the event processing system can use the event itself to identify which context partition the event belongs to.

For instance, in FIG. 3, in response to receiving the event 201 (act 401), the event sorting system 311 identifies the context partition 332 as corresponding to the event 201 (act 402), identifies the event processing system 322 as corresponding to the context partition 332 (act 403), and forwards the event to the event processing system 322 as represented by the arrow 301 (act 404). When sorting the event 201, the event sorting system 311 might modify (act 405) the event 201 to add an identification of the context partition 332, so that the event processing system 322 may quickly identify that the event belongs to the context partition 332. Alternatively or in addition, perhaps the event is not modified to identify the context partition of the associated event, but the event sorting system provides information (such as the partition identifier) in some other manner (such as in a separate communication) to the associated event processing system 322.

Further, in response to receiving the event 202 (act 401), the event sorting system 312 identifies the context partition 332 as corresponding to the event 202 (act 402), identifies the event processing system 322 as corresponding to the context partition 332 (act 403), and forwards the event to the event processing system 322 as represented by the arrow 302 (act 404). When sorting the event 202, the event sorting system 312 might modify (act 405) the event 202 (and/or communicate the partition identifier to the corresponding event processing system) to add an identification of the context partition 332, so that the event processing system 322 may quickly identify that the event belongs to the context partition 332.

Continuing the example, in response to receiving the event 203 (act 401), the event sorting system 312 identifies the context partition 334A as corresponding to the event 203 (act 402), identifies the event processing system 324 as corresponding to the context partition 334A (act 403), and forwards the event to the event processing system 324 as represented by the arrow 303 (act 404). When sorting the event 203, the event sorting system 312 might modify (act 405) the event 203 to add an identification of the context partition 334A (and/or communicate the partition identifier to the corresponding event processing system), so that the event processing system 324 may quickly identify that the event belongs to the context partition 334A.

Continuing, in response to receiving the event 204 (act 401), the event sorting system 313 identifies the context partition 331B as corresponding to the event 204 (act 402), identifies the event processing system 321 as corresponding to the context partition 331B (act 403), and forwards the event to the event processing system 321 as represented by the arrow 304 (act 404). When sorting the event 204, the event sorting system 313 might modify (act 405) the event 204 to add an identification of the context partition 331B (and/or communicate the partition identifier to the corresponding event processing system), so that the event processing system 321 may quickly identify that the event belongs to the context partition 331B.

Completing the example, in response to receiving the event 205 (act 401), the event sorting system 313 identifies the context partition 334A as corresponding to the event 205 (act 402), identifies the event processing system 324 as corresponding to the context partition 334A (act 403), and forwards the event to the event processing system 324 as represented by the arrow 305 (act 404). When sorting the event 205, the event sorting system 313 might modify (act 405) the event 205 to add an identification of the context partition 334A, (and/or communicate the partition identifier to the corresponding event processing system) so that the event processing system 324 may quickly identify that the event belongs to the context partition 334A.

The event sorting stage 310 may also be distributed, perhaps even throughout the globe. This might explain why, in this example, event 201 generated by component 211A of the distributed application 211 was received by the event sorting system 311, whereas the events 202 and 203 generated by the component 211B of the same distributed application 211 were received by the event sorting system 312. In this case, the event sorting system 311 may be more proximate from a network routing perspective (hereinafter referred to simply as "network proximate") to the first component 211A, whereas the event sorting system 312 may be more network proximate to the second component 211B.

FIG. 5 illustrates a flowchart of a method 500 for an event processing system to process incoming events. For instance, referring to FIG. 5, the event processing system 321 would perform the method 500 in response to receiving (as represented by arrow 304) the event 204 from the event sorting system 313. Likewise, the event processing system 322 would perform the method 500 in response to receiving (as represented by arrow 301) the event 201 from the event sorting system 311, and also would perform the method 500 in response to receiving (as represented by arrow 302) the event 202 from the event sorting system 312. Furthermore, the event processing system 324 would perform the method 500 in response to receiving (as represented by arrow 303) the event 203 from the event sorting system 312, and also would perform the method 500 in response to receiving (as represented by arrow 305) the event 205 from the event sorting system 313.

Figure 6:
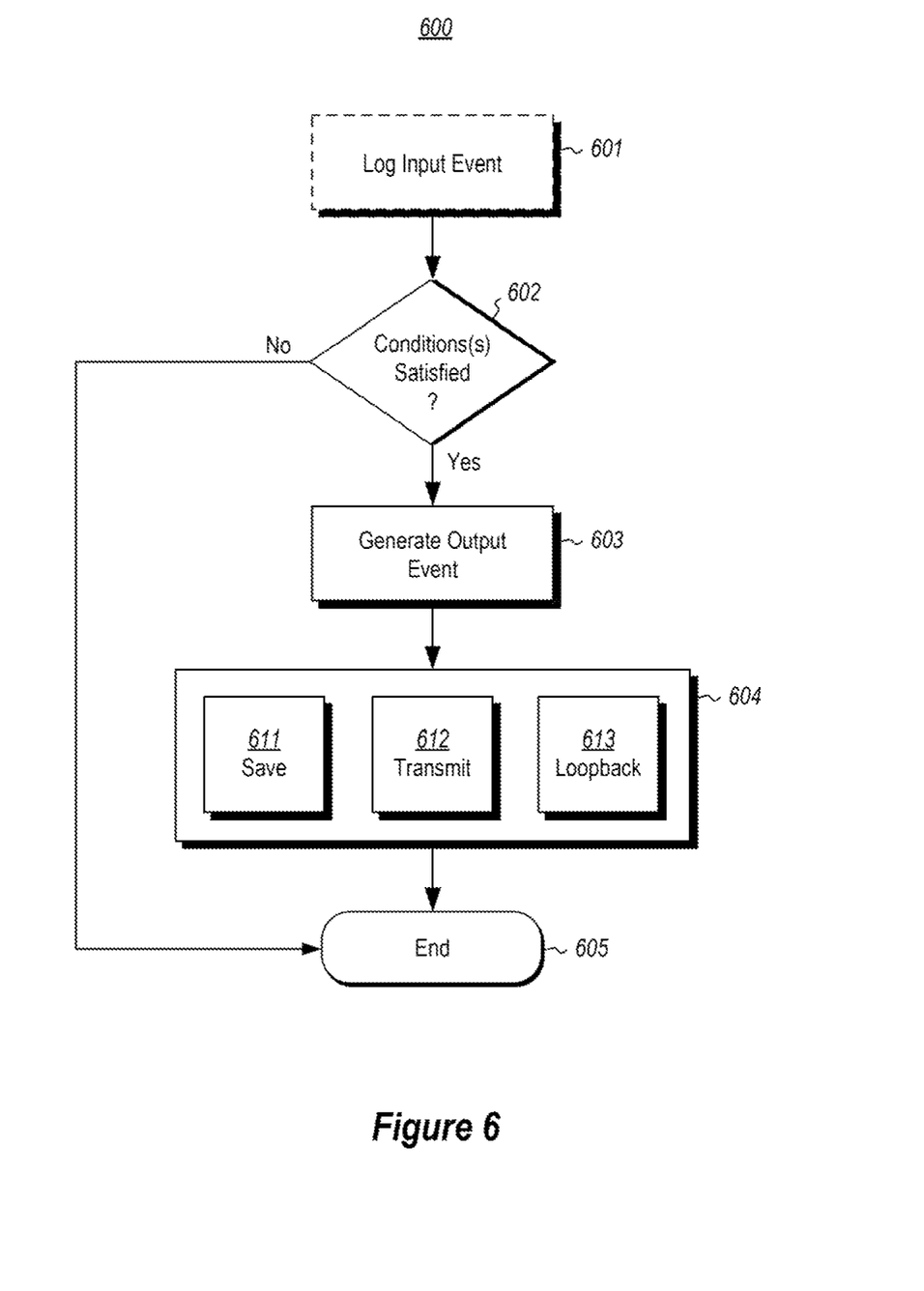
FIG. 6 illustrates a flowchart of a method for applying monitoring rules to events received from the event sorting stage.

The method 500 is initiated by an event processing system upon receiving and event from the event sorting stage (act 501). The event processing system then identifies the context partition to which the event belongs (act 502). For instance, if the context partition is identified in the event itself due to the optional performance of act 405, the content partition of the event might be identified by simply reading the context partition identifier. The monitoring rules to be applied to that partition are accessed and applied to the event (act 503) according to the event's context partition. FIG. 6 illustrates a flowchart of a method 600 for applying monitoring rules to events received from the event sorting stage, and represents an example of the act 503 of FIG. 5.

In accordance with method 600, the input event might possibly be used to generate an output event that may be acted upon. First, the input event is optionally logged (act 601). The event processing system then verifies whether one or more conditions upon which generation of the output event is predicated have been satisfied (decision block 602). If the condition(s) is/are not satisfied ("No" in decision block 602), processing of the input event ends (act 605).

If the condition(s) is/are satisfied ("Yes" in decision block 602), the input event is used to generate an output event (act 603). The output event may be of a different event type than the input event. Examples of event types include, for example, 1) a performance metric sample, which describes a performance metric provided by the application, 2) an alter change event which opens and closes an alert in the monitoring system 300, 3) an availability state event which indicates whether or not particular services are available, and 4) other events, such as custom events.

Note that the decision on whether the condition is met (decision block 602) might be based on state associated with the partition. For instance, suppose the monitoring rule is to generate a warning event if all events received in a rolling window of the most recent 3 hours indicate processor usage in excess of a certain percentage of capacity. In that case, perhaps there are tens of thousands of events received in the last 3 hours. Suppose now that the most recent event causes the 3 hour rolling average to increase above the threshold. The decision on whether or not the condition is met (decision block 602) would then actually involve much more than an analysis of the most recent invent, but would also involve an analysis of the partition state in which the information regarding the prior 9,999 events is represented.

Action is then taken upon the output event (act 604). The content of act 604 illustrates three potential example actions 611, 612 and 613 that might be taken on the output event. As an example, the event processing system might save the output event (act 611) such as to an identified store. Alternatively or in addition, the event processing system might transmit the output event outside of the system (act 612). Alternatively or in addition, the event processing system might loop back the event (act 613), which will now be described in further detail with respect to FIG. 3.

Looping back of the output event essentially allows the output event to be an input event that is assigned to the same or a different partition for further processing. In the loop back process, the event processing system that generated the output event may perform the method 400 and thus act as an event sorting system and treat the output event as a received input to the sorting process.

For instance, once the event processing system 321 processes the input event 204 as an event of the context partition 331B, the output event from such processing is looped back (as represented by arrow 343) to the same context partition 331B to be further processed as an input event, and thus the output event is subject again to the method 500.

The loop back arrows 341 and 342 illustrate a different form of looping back in which the output event from one partition is provided as an input event to another partition. For instance, the event processing system 322 processes one or both of events 201 and 202 as being part of context partition 332 to generate an output event that is looped back (as represented by arrow 341). The output event is then processed as an input event with a new context partition 333B. Likewise, the event processing system 324 processes one or both of events 203 and 205 as being part of context partition 334A to generate an output event that is looped back (as represented by arrow 342). The output event is then processed as an input event with the context partition 333B.

In the case of each of loop back arrows 341 and 342, loop back is used to allow the event processing stage 320 to perform tasks on chains of events. Furthermore, as loop back arrows 341 and 342 come from different context partitions to the same context partitions, the event processing stage 320 may serve to hierarchically process events.

This may be particularly helpful when context partitions may normally be quite large in the absence of hierarchical processing. For instance, perhaps the input stream to that context partition comes at a high rate of speed, and/or tracking of the state for the context partition would require large amounts of memory. In some cases, such a large context partition may simply be too large to process by a single context partition. In that case, the task might be divided into several smaller context partitions (by further defining a partition by a partition segment identifier), each smaller context partition doing the same work and producing an intermediate result. For instance, partitions 332 and 334A might represent examples of such partitions. The output event from each may represent intermediate results, allowing the intermediate result events to then be processed by the context partition 333B. For really large partitions, the partition may be perhaps even divided into hundreds or thousands of segments. Such looping back might be accomplished even two or more times in a single workflow to allow three of more stages of processing.

In real time, the events received for any particular context partition may indeed be considered to be an input event stream. The processing of the input event stream results in an output event steam, albeit perhaps with fewer output events (since the processing of some input events will not result in the generation of an output event following the "No" path in decision block 602). The number of output events may even be one or more or even many orders of magnitude fewer than the number of input events.

Examples of the implementation of monitoring rules will now be described. That said, the broadest principles described herein are not limited at all to the code used to implement the monitoring rules, nor whether even software itself is used to apply the monitoring rules. Accordingly, these code examples should be viewed as illustrative only.

In one embodiment, the input event stream of typed events can be accessed in monitoring rules from special selectors modeled with properties of the IObservable interface. This .Net interface is used by both StreamInsight and Rx as the model of incoming and outgoing data streams for temporal queries. Such temporal queries are accessible from a specific interface called IPartitionData. For example, consider the following code example:

```
public class BasicExample : IRule
{
    public IObservable<Empty> Initialize(IPartitionData data)
    {
        var query =
            from pf in data.PerfMetricSamples
            where pf.Value > 90
            select new MonitorState
            {
                Name = "Value is too high",
                MonitorId = pf.MetricId,
```

```
            State = States.Error
        });
        return Empty.CreateObservable(query);
    }
}
```

This rule is written in C# class and uses a temporal query defined in Rx syntax against a selector referenced as "IPartitionData data" and "data.PerfMetricSamples". This selector provides a stream of events of the type Performance Metric Sample within some partition. Thus, in this case, the input event stream is composed of portions from each of the input events for that partition that was received from the event sorting stage. The rule implementation is hosted inside a method Initialize of a class marked with the interface INamespaceRule, which is used to initialize the rule instance.

The data access object with IPartitionData interface contains partition id and namespace id properties as well as represented by the following declaration for the interface:

```
public interface IPartitionData
{
    IObservable<PerfMetricSample> PerfMetricSamples { get; }
    ...
    string NamespaceId { get; }
    string PartitionId { get; }
}
```

The resulting stream of the type IObservable<Empty> is used to keep the reference to the query instance to listen on the query state—in case it asynchronously throws the exception or stops. The resulting events themselves may be ignored. That is why the stub structure called "Empty" is used instead of real values.

The name of the interface suggests that this rule will be applied to the streams of every partition of some specific namespace. That allows creating rules, which should work for every data item in the overall stream of events—like the detection scenario from this example, a perhaps a rule like "aggregate and store all submitted performance metrics for this particular customer inside a performance data storage system".

One choice for the rule implementation would be StreamInsight query as well. One could switch between the Rx and StreamInsight contexts according to the following. Rx is a good match for processing sequence of events observed in time, when time itself is flowing naturally and is not controlled and the order of events is not defined. This allows only fuzzy time event correlation logic within local timespans (unless specialized Schedulers are used). On the other hand, StreamInsight technology allows expressing strict time-based queries, like one event time is equal to another with absolute precision, not within some epsilon—like it is usual for Rx.

The natural time flow is the case for many monitoring scenarios actually. In fact, examples below will be expressed in Rx, since they do not need to drive most precise time correlations extensively and local timespans manipulations within some epsilon are sufficient. Nevertheless, the basic example with the query implemented in StreamInsight syntax shows how another temporal engine can be naturally used in this monitoring rules model.

To define some action for the stream of given event types—the following built-in operators might be used: SaveAlert, SavePerfSample, Send, Loopback. SaveAlert can be applied to the stream of alert change alerts or the operator may be provided with the selector to convert given stream of events to alert change events. This operator saves the stream of monitor states to an alert store, which in turn opens or closes alerts. SavePerfSample has the same logic as SaveAlert, but sends the data to the performance data storage system and is be applied to a stream of performance counters events or availability states alerts (or provided with corresponding selector). Send can push the data outside of the system (to notify partner monitoring system, for example). Loopback shares the resulting events for the secondary queries for the same or another partition (for example, first query aggregates counters across the source and second query defines detection for aggregated counters) as explained above.

So, to register the alert in monitoring system for the query above one might add a SaveAlert operator for the stream of MonitorState events as follows:

```
public class AlertingRule : IRule
{
    public IObservable<Empty> Initialize(IPartitionData data)
    {
        var query =
            (from pf in data.PerfMetricSamples
            where pf.Value > 90
            select new MonitorState
            {
                Name = "Value is too high",
                MonitorId = pf.MetricId,
                State = States.Error
            }).SaveAlert( );
        return Empty.CreateObservable(query);
    }
}
```

Another form allows the definition of the same semantics with one less operator and with operator ToEmpty, which wraps the query, chained together as follows:

```
public class AlertingRule : IRule
{
    public IObservable<Empty> Initialize(IPartitionData data)
    {
        return
            data
                .PerfMetricSamples
                .Where(pf => pf.Value > 90)
                .SaveAlert(pf => new MonitorState
                {
                    Name = "Value is too high",
                    MetricId = pf.MetricId,
                    State = States.Error
                })
                .ToEmpty( );
    }
}
```

This query will generate alert for the system for any counter submitted for the partner, who defined this query, with the value higher than 90. That is not particularly useful from monitoring perspective, since it is applied for any counter submitted by given customer. To make this query more specific one need to add stream filtering operators as in the following example:

```
public class JohnSmithAlertingRule : IRule
{
  public IObservable<Empty> Initialize(IPartitionData data)
  {
    var query =
      (from pf in data.PerfMetricSamples
      where pf.Value > 90
      where pf.MetricId == "CPU" && pf.SourceId ==
      "Service #1/Machine #18"
      select new MonitorState
        {
          Name = "CPU is too high for Machine #18",
          MonitorId = pf.SourceId + "/" + pf.MetricId,
          State = States.Error
        }).SaveAlert( );
      return Empty.CreateObservable(query);
  }
}
```

This is much more meaningful rule, which might be extremely useful in some real-life scenarios. One of the big advantages of this approach is that the generated alert will be registered in the system with extremely low latency. All the computations defined by this query will be done in memory in real time. So the only delays would be with delivering requests between services, which can be done in terms of seconds at most.

The close look at the previous query will reveal that the query is now extremely scenario-specific for the very specific source. So when partner wants to setup similar monitoring rule for the same or another source—one could define exactly the same rule, but with another values hardcoded in the query. That does not look like an efficient way to manage monitoring rules. Besides the last rule would execute over each data item in all streams submitted by partner, which might become a problem and a scaling issue. The scale would be limited by the amount of the memory consumed by every partition to host the configuration objects and the query state.

To solve the problem of defining and maintaining almost identical rules and the scaling issues at the same time—it is possible to define a rule specific for some context partition (defined by a namespace id and partition id in the following example) alongside with the rule configuration type. For instance, the partner could define the following classes for configuration objects:

```
public class OneCounterRuleConfig
{
  public double CounterTreshold { get; set; }
  public string MetricId { get; set; }
  public string SourceId { get; set; }
  public string MonitorStateName { get; set; }
}
```

The query could be rewritten using another generic interface IRule<TConfig> to define the following rule:

```
public class RuleWithConfiguration : IRule<OneCounterRuleConfig>
{
  public IObservable<Empty> Initialize(IPartitionData data,
  OneCounterRuleConfigruleConfig)
  {
    return
      data
        .PerfMetricSamples
        .Where(pf => pf.Value > ruleConfig.CounterTreshold)
        .Where(pf => pf.MetricId == ruleConfig.MetricId &&
  pf.SourceId == ruleConfig.SourceId)
```

```
        .SaveAlert(pf => new MonitorState
        {
          Name = ruleConfig.MonitorStateName,
          MetricId = pf.MetricId,
          SourceId = pf.SourceId
        })
        .ToEmpty( );
  }
}
```

The system 300 might provide the REST API for partners to manage configuration object per rule type and the partition. Since the configuration object is submitted for specific partition—the scope of data for such rule instance is stream data items pushed into given partition.

The system 300 may host instances of the rule for each configuration object submitted for a specific partition. In case when no matching configuration was provided, but the rule was defined with a configuration—perhaps no instance of this rule will be hosted in the service.

The lifetime of usual rules that have no configuration are inherited from IRule. Such rules are instantiated automatically for every partition in given namespace (hence the name) and they do not wait on the configuration to be provided. There is a generic version of IRule<TConfig> as well. Rules of this type perhaps are not instantiated until single instance of configuration is provided for the whole namespace.

For the monitoring rules may be partition-specific (application specific, customer specific, Role specific, etc.)—the rule may implement an IRule<TConfig> interface and will be instantiated by configuration objects.

The last query is an example of a monitoring rule for on-premise one-machine application. In the cloud however application logic is distributed across multiple machines. That means that monitoring rules should be ready to calculate state across multiple machines to detect given condition. And that is to be done with low latency and low cost.

That can be easily with the help of in-memory computations expressed as temporal queries. The last query could be extended further for scenarios, when real-time aggregation of counters across sources is required first (definition of configuration class is skipped):

```
public class DetectionAcrossSources :
IRule<AggregatedCounterRuleConfig>
{
  public  IObservable<Empty>  Initialize(IPartitionData  data,
AggregatedCounterRuleConfig ruleConfig)
  {
    return
      data
        .PerfMetricSamples
        .Where(pf => pf.MetricId == ruleConfig.MetricId &&
  pf.Context == ruleConfig.TenantId)
        .Buffer(TimeSpan.FromSeconds
        (ruleConfig.CounterResolutionInSeconds))
        .Where(buffer => buffer.Count > 0)
        .Select(buffer => new PerfMetricSample
        {
          Value = buffer.Average(pf => pf.Value),
          MetricId = ruleConfig.AggregatedMetricId,
          SourceId = "System 300"
        })
        .Where(pf => pf.Value > ruleConfig.CounterTreshold)
        .SaveAlert(pf => new MonitorState
        {
          Name = ruleConfig.MonitorStateName,
          MonitorId = pf.MetricId,
```

```
            TenantId = ruleConfig.TenantId,
            State = States.Error
        })
        .ToEmpty( );
    }
}
```

This query is almost the same as the previous version. It has three additional standard Rx operators which are underlined. The semantics for this query is as follows: —buffer all incoming filtered performance counters for a given period of time and then produce the stream of aggregated counters over different sources, which can be used for alerting.

It is worth to point out, that highlighted sub-query is going could be used across different monitoring rules and can be hidden behind C# subroutine:

```
public class DetectionAcrossSources :
IRule<AggregatedCounterRuleConfig>
{
    public     IObservable<Empty>     Initialize(IPartitionData    data,
AggregatedCounterRuleConfig ruleConfig)
    {
        return
            data
                .PerfMetricSamples
                .Where(pf => pf.MetricId == ruleConfig.MetricId &&
pf.SourceId == ruleConfig.SourceId)
                .SelectAverage(
ruleConfig.AggregatedMetricId,
                    TimeSpan.FromSeconds
                    (ruleConfig.CounterResolutionInSeconds))
                .Where(pf => pf.Value >
ruleConfig.CounterTreshold)
                .SaveAlert(pf => new MonitorState
                    {
                        Name = ruleConfig.MonitorStateName,
                        MonitorId = pf.MetricId,
                        TenantId = ruleConfig.TenantId,
                        SourceId = pf.SourceId
                    })
                .ToEmpty( );
    }
}
```

The underlined operator SelectAverage is a custom-made extension, which customers can re-use out of the box.

That said, the above is just a specific example of how the rules might be implemented inside a particular event processing system. Accordingly, the more general principles described herein provide an effective system for processing events provided by distributed applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for monitoring and processing computer-generated events, the system comprising:
one or more computer processors; and
computer readable data storage having stored therein computer executable instructions which, when executed upon the one or more processors, cause the system to instantiate:
an event sorting stage comprising a plurality of event sorting systems; and
an event processing stage comprising a plurality of distinct event processing systems, each of the event processing systems being configured to process events that fall within one of a plurality of distinct context partitions, each context partition being defined by a particular and distinct set of characteristics;
wherein each of the plurality of event sorting systems are configured to receive one or more events from one or more applications and each event sorting system is configured, in response to receiving at least one of the one or more events, to:
identify a set of characteristics possessed by the at least one received event;
based on the identified set of characteristics possessed by the at least one received event, identify a context partition corresponding to the identified set of characteristics possessed by the at least one received event;
identify the event processing system that corresponds to the identified context partition of the at least one received event; and
forward the at least one received event to the identified event processing system; and
wherein each of the event processing systems is configured to:
process events received from an event sorting stage and falling within the particular context partition that corresponds to the each event processing system by applying monitoring rules to the events received from the event sorting stage.

2. The system in accordance with claim 1, wherein a particular application of the one or more applications is a distributed application.

3. The system in accordance with claim 2, wherein the event sorting stage is distributed such that a first plurality of events generated by a first part of the distributed particular application are received at a first event sorting system of the plurality of event sorting systems and a second plurality of events generated by a second part of the particular distributed application are received at a second event sorting system of the plurality of event sorting systems.

4. The system in accordance with claim 1, wherein the event processing stage is distributed.

5. The system in accordance with claim 4, wherein the event processing stage comprises at least a first event processing system and a second event processing system, wherein the first event processing system processes events that fall within a first set of one or more context partitions, and the second event processing system processes events that fall within a second set of one or more context partitions.

6. The system in accordance with claim 5, wherein the first event processing system has a first processor-addressable data vessel usable by code executing on the first event processing system, and wherein the second event processing system has a second processor-addressable data vessel usable by code executing on the second event processing system.

7. The system in accordance with claim 1, wherein a context partition of an event is identified using at least a customer identifier.

8. The system in accordance with claim 1, wherein a context partition of an event is identified using at least an application identifier.

9. The system in accordance with claim 1, wherein a context partition of an event is identified using at least hosted service name.

10. The system in accordance with claim 1, wherein a context partition of an event is identified using at least a role identifier.

11. The system in accordance with claim 1, wherein a context partition of an event is identified using at least a namespace.

12. The system in accordance with claim 1, wherein a context partition of an event is identified using at least a network site identifier.

13. The system in accordance with claim 1, wherein a context partition of an event is identified using at least a time identifier.

14. The system in accordance with claim 1, wherein applying monitoring rules to events received from the event sorting stage comprises:
    accessing an input event;
    using the input event to generate an output event; and
    taking action upon the generated output event.

15. The system in accordance with claim 14, wherein taking action upon the output event comprises:
    saving the output event to a data store.

16. The system in accordance with claim 14, wherein taking action upon the output event comprises:
    looping back the output event to an output context partition such that the output event is treated as an new input event to an event processing system that corresponds to the output context partition.

17. The system in accordance with claim 16, wherein the output context partition of the output event is different than the context partition of the original input event.

18. The system in accordance with claim 14, wherein taking action upon the output event comprises:
    transmitting the output event outside of the system.

19. A method for an event processing system to process an input event, the method comprising:
    executing computer-executable instructions upon one or more processors of the event processing system, thereby causing the event processing system to:
    receiving an input event originating from a distributed application, the input event forwarded from an event sorting stage which identifies a set of characteristics possessed by the input event and, based on the identified set of characteristics possessed by the input event, identifies a corresponding context partition and forwards the input event to the event processing system associated with the corresponding context partition; and
    applying a monitoring rule to the input event by:
        generating a new event based on the monitoring rule as applied to the input event;
        determining whether the input event has one or more particular characteristics; and
        in response to determining that the input event has the one or more particular characteristics:
            using the input event to generate an output event which has an output context partition; and
            performing one or more of:
                saving the output event to a data store;
                looping back the output event such that the output event is treated as an input event to another event processing system that corresponds to the output context partition; or
                transmitting the output event outside of the system.

20. A computer program product comprising one or more computer-readable storage devices having stored thereon computer-executable instructions that, when executed by one or more processors of an event processing system, cause the event processing system to perform a method for processing an input event, the method comprising:
    receiving an input event originating from a distributed application, the input event forwarded from an event sorting stage which identifies a set of characteristics possessed by the input event and, based on the identified set of characteristics possessed by the input event, identifies a corresponding context partition and forwards the input event to the event processing system, the context partition having been determined by the event sorting stage based on at least one of a customer identifier, an application identifier, hosted service name, a role identifier, a namespace, a network site identifier, or a time identifier;
    applying a monitoring rule to the event by:
        determining whether the input event has one or more particular characteristics;
        in response to determining that the event has the one or more particular characteristics, using the input event to generate an output event; and
        processing the generated output event.

* * * * *